United States Patent [19]

Kuehn et al.

[11] Patent Number: 4,582,111
[45] Date of Patent: Apr. 15, 1986

[54] RADIATION ABSORBING SURFACES

[75] Inventors: Robert D. Kuehn, Eagan; Valdis Mikelsons, Mendota, both of Minn.; Gary L. Dorer, Taunton, all of Mass.

[73] Assignee: Minnesota Mining and Manufacturing Company, St. Paul, Minn.

[21] Appl. No.: 474,716

[22] Filed: Mar. 10, 1983

Related U.S. Application Data

[62] Division of Ser. No. 278,979, Jun. 29, 1981, Pat. No. 4,396,643.

[51] Int. Cl.⁴ ............................................. B22D 23/00
[52] U.S. Cl. ...................................................... 164/46
[58] Field of Search ......................................... 164/46

[56] References Cited

U.S. PATENT DOCUMENTS

| | | | |
|---|---|---|---|
| 2,891,879 | 6/1959 | Rohrer | 117/201 |
| 3,666,527 | 5/1972 | Feldstein et al. | 117/47 |
| 3,690,944 | 9/1972 | Feldstein | 117/160 |
| 4,138,262 | 2/1979 | Wacks et al. | 96/87 |
| 4,148,294 | 4/1979 | Scherber et al. | 126/270 |
| 4,190,321 | 2/1980 | Dorer et al. | 350/165 |
| 4,233,107 | 11/1980 | Johnson | 156/632 |
| 4,252,843 | 2/1981 | Dorer et al. | 427/162 |

Primary Examiner—Kuang Y. Lin
Assistant Examiner—Richard K. Seidel
Attorney, Agent, or Firm—Donald M. Sell; James A. Smith; Lorraine R. Sherman

[57] ABSTRACT

A substantially radiation absorbing layer of metal having a microstructured surface characterized by a plurality of randomly positioned discrete protuberances of varying heights and shapes, which protuberances have a height of not less than 20 nanometers nor more than 1500 nm, and the bases of which contact the bases of substantially all adjacent protuberances is disclosed. The metal layer, which may be a coating on a variety of substrates, is useful as a radiation absorber (particularly solar). A method is disclosed for producing such layers.

7 Claims, 5 Drawing Figures

RADIATION ABSORBING SURFACES

This application is a divisional application of copending U.S. Ser. No. 278,979, filed June 29, 1981, now U.S. Pat No. 4,396,643.

TECHNICAL FIELD

The present invention relates to articles having novel radiation absorbing surfaces and to a method for producing such surfaces on a variety of substrates. These radiation absorbing surfaces are useful in solar absorbers and in fabricating graphic arts films.

BACKGROUND ART

There is currently considerable interest and research into ways to utilize solar energy to help overcome society's present dependence on a diminishing supply of fossil fuels and problem-ridden nuclear fuels. Alternative non-polluting energy sources such as solar energy would be highly desirable. To make solar energy economically feasible, highly efficient radiation absorbing surfaces are needed.

A number of radiation absorbing surfaces are known in the prior art. They may have selective or non-selective characteristics. A selective radiation absorbing surface is one which has high absorptivity and low reflectivity in the solar radiation range and low emissivity and high reflectivity in the thermal infrared region of the electromagnetic spectrum. For a non-selective surface, the absorption and emission properties do not change appreciably in the above two spectral regions.

At least three well-known methods of preparing selective black radiation absorbing surfaces exist in the art. One method involves the coating of a metal base with a thin film that absorbs solar radiation but is transparent to infrared radiation. The high infrared reflectivity of the base provides the low infrared emissivity. A second method requires the coating of an opaque metal or metallic oxide having a high infrared reflectivity but a low solar reflectivity with antireflection layers such that the solar reflectivity is further reduced, thereby enhancing the solar absorption. Finally, a third method of obtaining a selective black absorber is to fabricate a wire-mesh with appropriate dimensions such that solar radiation, but not infrared, is trapped. An example of a selective radiation absorbing surface is disclosed in U.S. Pat. No. 4,148,294 which teaches a solar energy absorbing panel having metal bodies projecting longitudinally out from spaced pores in a substrate.

Non-selective surfaces may be produced by utilizing coatings of paint or enamels. Black paints are preferred and are generally composed of carbon in a binder, or a combination of carbon and calcium phosphate in a binder material. Other black coatings useful as non-selective absorbers are disclosed in U.S. Pat. No. 2,891,879 wherein finely divided aluminum is mixed with an organopolysiloxane and, if desired, further mixed with a suitable solvent such as butyl acetate or toluene. These materials are coated on suitable substrates by a variety of methods, such as spraying, dipping, painting, knife coating, spinning, and printing. A non-selective black, non-shiny and substantially non-reflective surface is disclosed in U.S. Pat. No. 4,138,262 wherein bismuth is first sputtered and then vacuum evaporated onto a flexible plastic substrate followed by a coating of photoactive material. The coated material is then utilized as an imaging film.

Selective radiation absorbing surfaces known in the art suffer from a variety of shortcomings. These are problems of metal grain particle agglomeration, temperature instability, undesired chemical reaction, and high cost of preparation of the coatings. Non-selective absorbing surfaces often suffer from high temperature instability, poor weatherability, and inefficient absorption over an extended wavelength range.

Assignee's U.S. Pat. No. 4,426,437, issued Jun. 17, 1984, discloses imageable articles utilizing the radiation absorbing composite surfaces of the present invention.

DISCLOSURE OF INVENTION

The present invention overcomes many of the prior art problems by providing an article exhibiting appreciable radiation absorbance (particularly solar), high temperature stability, good weatherability, and which is economically produced. The novel radiation absorbing surfaces have substantially selective characteristics. In another aspect, a method is provided for preparing such surfaces on a variety of substrates.

The present invention provides a substantially radiation absorbing layer of metal having a microstructured surface characterized by a plurality of randomly positioned discrete protuberances of varying heights and shapes, which protuberances have a height of not less than 20 nanometers nor more than the wavelength of the radiation absorbed, i.e., 1,500 nanometers, and the bases of which contact the bases of substantially all adjacent protuberances. The tips or apices of the protuberances are spaced apart a distance in the range of 3 to 500 nm. The average spacing between the tips can be no more than twice the average height of the protuberances, and preferably it is no more than half the average height. The most preferred average spacing between the tips is in the range of 1/10 to ¼ the average height of the protuberances.

In the preferred embodiment, the articles of the present invention comprise a substrate, a microstructured metal oxide (or hydroxyoxide) layer, and an overcoating of a thin film of at least one metal. In a second embodiment, the article has a microstructured replicated composite surface of a material such as plastic, overcoated by a thin-film of at least one metal. In a third embodiment, the article is a replicated microstructured surface of metal. In the preferred embodiment, the articles of the present invention comprise a substrate which may be of virtually any construction, i.e., transparent or opaque, insulative, semiconductive or metallic, having a flat, curved or complex shape, and having formed thereon a non-absorbing metal oxide coating, the metal being selected from the group consisting of aluminum, magnesium, zinc, or alloys thereof. The oxide layer is formed by the substantially complete conversion of a thin-film of a metal or metal alloy, the thickness of which thin-film prior to conversion was in the range of 5 to 200 nm. The thickness of the thin-films can vary within these same limits over the surface of the article. Thus, careful control of the thickness of the starting thin-film is not necessary. The oxide layer exhibits a surface characterized by a plurality of randomly positioned discrete protuberances of varying heights and shapes, which protuberances extend from the surface of said substrate a distance of not less than 20 nm, nor more than the wavelength of the radiation absorbed, i.e., 1,500 nanometers, and the bases of which are in substantial contact with the bases of each of adjacent protuberances. The metal oxide layer is overcoated by a thin-film of metal from 40 nanometers to 200 nanometers thick, such that the outer surface of the metal coating substantially conforms to the shape of the structured surface of the oxide layer without completely filling in the valleys and void spaces. When so structured, and without the use of dyes or pigments, the article exhibits absorbance over the total solar range of 70 percent to 98 percent.

A method for generating the absorbing surfaces of the preferred embodiment comprises the steps of forming a microstructured layer on a substrate, which method is disclosed in U.S. Pat. No. 4,252,843 which is hereby incorporated herein by reference, and then depositing a thin layer of metal on the microstructure in such a manner that the deposited material conforms to the structure and closely replicates the underlaying topography in the exterior surface of the deposited material film.

Alternatively, the microstructure of the metal oxide layer may be replicated into the surface of a second element and the replicated microstructured surface overcoated with a thin film of at least one metal from 40 nm to 200 nm thick to produce a radiation absorbing article. If the replicated surface is itself metallic with a microstructure according to the teachings of this invention then it need not be overcoated, although it may be, with a thin-film of metal.

"Microstructure" refers to the rough and structured topography resulting from the conversion of a metal thin-film to an oxide or hydroxide layer or replica thereof by a chemical or chemical/electrochemical method. The replication can take place in materials such as plastics which are then overcoated with metals, or the replication may be directly into a metal.

DETAILED DESCRIPTION OF THE INVENTION

The present invention provides, in a preferred embodiment, an article having a substantially radiation absorbing surface, said article comprising:

a substrate having on at least one surface thereon, a layer of an oxide of a metal selected from the group consisting of aluminum, magnesium, zinc, or alloys thereof, which layer is a substantially complete conversion of a thin-film of the metal, the thickness of the thin-film prior to conversion being at least 5 nanometers and exhibiting a surface after the conversion characterized by a plurality of randomly positioned discrete protuberances of varying heights and shapes, which protuberances extend from the substrate surface a distance of not less than 20 nanometers nor more than the wavelength of the radiation absorbed, i.e., 1,500 nanometers, and the bases of which contact the bases of substantially all adjacent protuberances, and an overcoating upon the oxide layer, which overcoating is a contiguous connected thin layer of metal having a thickness in the range of 40 to 200 nanometers.

Figure 1:
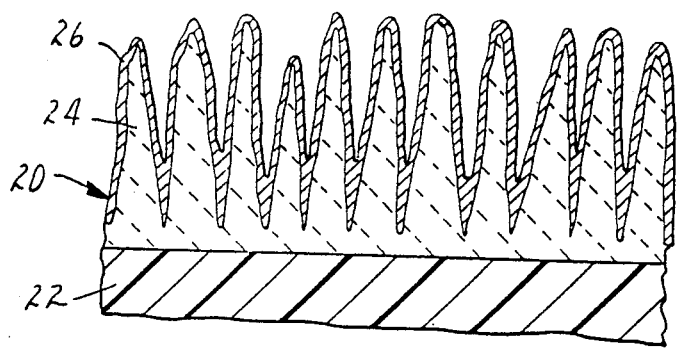
FIG. 1 is an enlarged sectional view of the preferred embodiment of the present invention showing a microstructured oxide layer on a substrate overcoated by a thin-film of metal.

The articles having novel radiation absorbing surfaces and the method for producing such surfaces on a variety of substrates such as aluminum, stainless steel, glass, polycarbonate, polyacetate, or polyester, can best be understood by referring more particularly to the drawing. A prior art article comprising a substrate upon which is formed a microstructured oxide layer is disclosed in U.S. Pat. No. 4,190,321, incorporated herein by reference. Referring now to FIG. 1, there is shown the novel radiation absorbing article 20 of the present invention, the article comprising substrate 22 upon which is formed microstructured oxide layer 24 which is overcoated with a thin layer of metal 26. In the process for producing the preferred embodiment of the present invention, article 20 is formed by depositing a thin metal film on the prior art embodiment such that the metal coating conforms to the shape of the structured surface of the substrate without filling in the valleys and void spaces. Article 20 is an excellent radiation absorber. Before it is overcoated, microstructured oxide layer 24 exhibits a surface morphology which can generally be described as being a plurality of randomly positioned discrete protuberances of varying heights and shapes, the base of each protuberance being in substantial contact with the base of adjacent protuberances. The protuberances extend from the substrate surface a distance of not less than 20 nanometers, and preferably extend from the substrate surface a distance varying from that corresponding to the wavelength of the radiation absorbed down to 1/10 that wavelength, i.e., approximately 1500 down to 40 nanometers.

Figure 2:
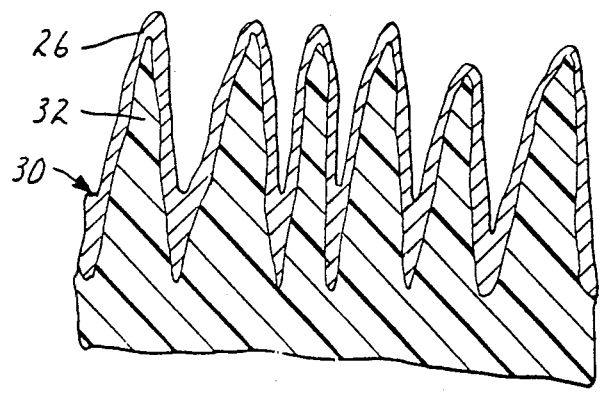
FIG. 2 is an enlarged sectional view of a second embodiment of the present invention depicting a substantially radiation absorbing composite structure comprising a replicated microstructured surface overcoated by a thin-film of metal.

FIG. 2 shows a second embodiment 30 of the present invention wherein the microstructure of the above-mentioned metal oxide layer is replicated into the surface of a second element 32, which may be an embossable or castable material, metal, nonmetal, or organic. The replicated microstructured surface 32 is then overcoated by a thin-film of metal 26 to produce an article of the present invention having a substantially radiation absorbing surface.

Thin film 26 covering microstructures 24 and 32 can be selected from a variety of suitably stable metals; preferably it is chromium, aluminum, copper, gold, or nickel; and most preferably it is chromium. Metal alloys may also be used. Thin film 26 can be deposited by vacuum vapor deposition, sputtering, electroless plating, chemical vapor deposition, or other suitable methods. A single film or a set of films using different materials may be used. All metals give selective surfaces, although some are better than others depending on individual metal emissivity. The choice of the material for the substrate helps determine the amount of absorbed energy which will be reradiated. Suitable substrate materials to produce low radiation emitters are metals such as stainless steel, aluminum, chromium, copper, and nickel. Materials which are high thermal radiators are dielectrics such as glass and ceramics. Thin layer 26 has a thickness in the range of 40 to 200 nanometers, preferably 40 to 160 nm and most preferably 50 to 80 nm.

Figure 3:
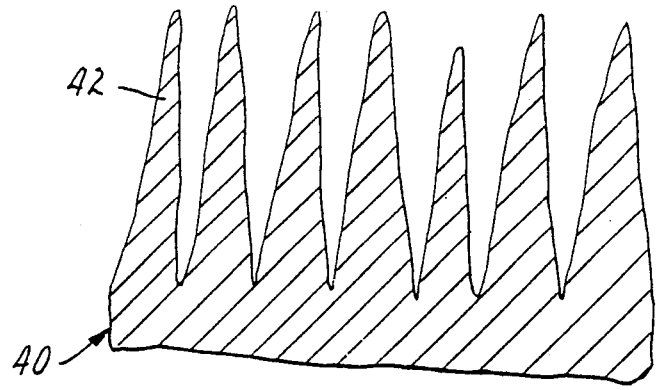
FIG. 3 is an enlarged sectional view of a third embodiment of the present invention showing a replicated microstructured metallic surface.

FIG. 3 shows a third embodiment 40 of the present invention wherein the replicated microstructured surface 42 is itself metallic (single or multiple layered) and is a self-supporting article according to the present invention which is substantially radiation absorbing.

Articles having the novel radiation absorbing surfaces of the present invention include selective solar absorbers, for example, flat plate solar collectors, and, in combination with photoactive materials, are useful as silverless graphics art films.

Objects and advantages of this invention are further illustrated by the following examples, but the particular materials and amounts thereof recited in these examples, as well as the conditions and details, should not be construed to unduly limit this invention.

EXAMPLE 1

A glass slide was cleaned and then a portion was vapor coated with 30 nm of aluminum on one side. The aluminum film was then subjected to saturated steam at a temperature of about 95° C. for approximately three minutes, during which time the film was completely converted to a microstructured layer of boehmite, AlO(OH), approximately 120 nm thick. The slide was subsequently rinsed, dried, and then the coated side was overcoated with a coating about 160 nm thick of vapor deposited chromium. The area on the glass slide where the chromium was deposited over the structured layer of boehmite was black and non-reflective and was a very good absorber. The area where the chromium was deposited directly on glass was shiny and highly reflective and was a very poor absorber.

EXAMPLE 2

A 200 micron thick clean foil of #3003 aluminum alloy (available from Alcoa) was exposed to saturated steam as in Example 1 for about 2 or 3 minutes to generate a layer of boehmite and then was overcoated on one major surface by vacuum vapor deposition of a coating of approximately 51 nm thick of chromium. The surface appeared black and was shown to be non-reflecting and a good absorber. The emissivity, E, was measured and found to be 0.19 which demonstrated that it was a poor emitter and thus did not reradiate the absorbed energy.

EXAMPLE 3

A radiation absorbing surface was prepared as in Example 2 with the exception that the chromium layer was about 87.5 nm thick. The surface again appeared black and was shown to be non-reflecting. The measured emissivity was 0.38 which demonstrated again that most of the absorbed energy was not reradiated.

EXAMPLES 4 and 5

Figure 4:
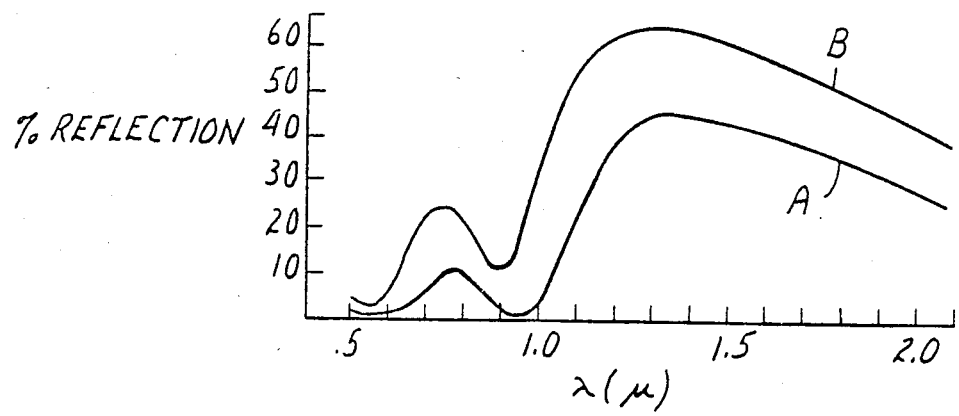
FIG. 4 is a graph of the reflectance, before (curve A) and after (curve B) heat treatment, as a function of electromagnetic radiation wavelength for a radiation absorbing surface using a chromium overcoating 75.9 nm thick according to the present invention.
Figure 5:
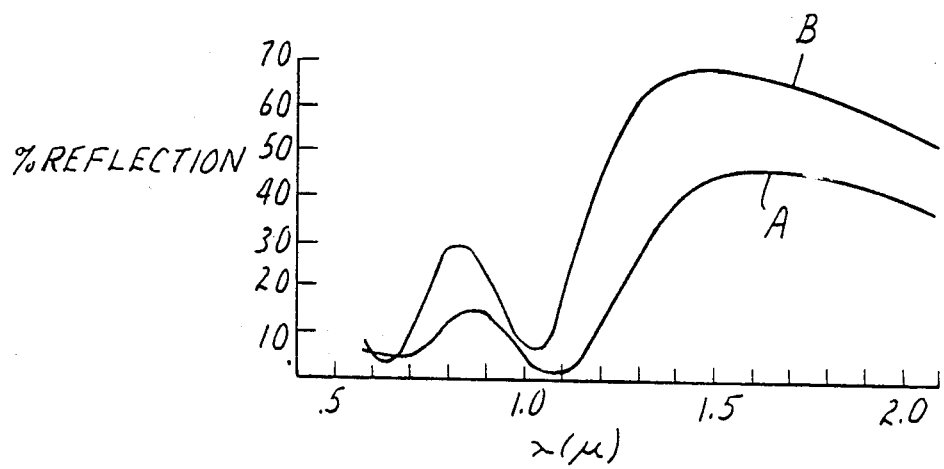
FIG. 5 is a graph of the reflectance, before (curve A) and after (curve B) heat treatment, as a function of electromagnetic radiation wavelength for a radiation absorbing surface using a different metal thickness (i.e., 100 nm) according to the present invention.

Radiation absorbing surfaces were prepared as in Example 2 with the exception that the chromium layers were about 75.9 nm and 100 nm thick, respectively. The surfaces again appeared black and were non-reflecting and the emissivities measured 0.28 and 0.38, respectively. The samples were then heated in air for 68 hours at a temperature of 300° C. The reflectivities as a function of wavelength were measured before (curve A) and after heat treatment (curve B) and are shown in FIGS. 4 (75.9 nm thick chromium overcoating) and 5 (100 nm thick chromium overcoating). The emissivity after heat treatment was 0.17 and 0.21, respectively.

The increase in reflectivity and the shifts in the spectral positions of the reflection maxima and minima may be related to oxidation (decrease in thickness) of the chromium layer. The decrease of emissivity associated with increased reflectivity is in accord with Kirchhoff's law which states that $E = 1 - R$, where R is the reflectivity of the surface. This emissivity versus metal film thickness relationship was also observed in the absence of heat treatment, as Examples 2–5 show. That is, E was lower for thinner chromium films.

EXAMPLE 6

A portion of one surface of a polyester film was vacuum vapor coated with a layer of aluminum approximately 50 nm thick and subsequently converted to boehmite by exposure to steam as in Example 1. Electron micrographics of the converted layer on polyester show it to be structured and composed of pointed protuberances extending upward from the surface to a height of approximately 120 nm with the tips spaced about 20 nm apart. A 125 micron thick film of low density polyethylene was then placed on the microstructured surface and subsequently laminated between two plattens heated to 125° C. and pressed together at a pressure of about 141 kg/cm$^2$ for two minutes. After cooling, the embossed polyethylene film was peeled from the boehmite surface and then overcoated on the embossed side with 52 nm of chromium. The surface appeared very black and was a good absorber where the boehmite microstructure portion had been embossed into the polyethylene and bright, shiny metallic and a poor radiation absorber where the polyethylene was smooth.

EXAMPLE 7

A layer of boehmite was formed on a thin aluminum foil by immersing it for ten minutes in water at 70° C. and pH 8.65. After rinsing the foil in distilled water, a layer of nickel was deposited on one side on the boehmite structure using an electroless method described in U.S. Pat. Nos. 3,666,527 or 3,690,944. The surface of the foil on the side on which the nickel was deposited appeared black. The measured reflectivity of the surface was less than 4% in the wavelength range between 380 nm and 700 nm; the emissivity was 0.52. The measured values indicated that an absorber with substantially selective surface properties had been produced.

EXAMPLE 8

A 60 nm thick film of magnesium was vapor coated onto one side of a polyester sheet. The sample was then immersed in deionized water at 55° C. to convert the magnesium metal film to a microstructured layer of hydrated oxide. The microstructured layer was then overcoated by vacuum vapor deposition with a 45 nm thick film of copper. The surface appeared black where the copper was deposited over the microstructure and it was a good absorber.

EXAMPLE 9

A 225 micron thick foil of #5352 aluminum alloy (available from Alcoa) was etched in aqueous 2.5% NaOH solution at 54° C. for 30 seconds, rinsed and exposed to steam for three minutes. Then 80 nm of chromium was coated on the structured surface by vacuum vapor deposition. The panel appeared dark gray. The panel was then dipped for 20 seconds in aqueous $KMnO_4$ solution at 73° C. to oxidize the chromium surface. The panel appeared dark blue-black and its absorption was enhanced.

EXAMPLE 10

A 30 cm×30 cm×1.25 cm piece of acrylic sheet was cleaned with a mild detergent, rinsed with distilled water and dried. A 45 nm thick layer of aluminum was deposited on the clean surface via vacuum metallization. The aluminized surface was then exposed to steam for about five minutes to convert it to microstructured aluminum oxide (boehmite). The microstructure was then replicated in metal by vacuum metallizing the surface first with chromium (20 nm) and then gold (300 nm). In addition to replication, this step produced a surface which was also conductive and served as the cathode for the next step which was to produce a heavy metal electroform backing. The acrylic sheet substrate was then removed by shearing at the acrylic sheet substrate/boehmite microstructure interface. The boehmite microstructure was next removed from the replicated metal surface via an acid etch treatment followed by a distilled water rinse and dried. This treatment left a replica of the boehmite microstructure in the chromium layer.

The absorber thus obtained had a measured emissivity of 0.123 and an absorption in the visible region of the solar spectrum of greater than 98% at 400 nm, decreasing to greater than or equal to 91% at 700 nm. This was comparable to selectivity claimed by other commercial processes such as the black nickel and black chrome electroplates.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for absorbing radiant energy by a metal having a radiation absorbing surface said method comprising the steps:
   (a) preparing a metal having a substantially radiation absorbing surface by a process comprising the steps:
   (1) providing a substrate having on at least one surface thereof a first microstructured layer, said layer being an oxide or hydroxyoxide of a metal, selected from the group consisting of aluminum, magnesium and zinc or alloys thereof, which layer is a substantially complete conversion of a thin-film of said metal, the thickness of said thin-film prior to conversion being at least 5 nanometers and exhibiting a surface after said conversion characterized by a plurality of randomly positioned discrete protuberances of varying heights and shapes, which protuberances extend from said substrate surface a distance of not less than 20 nanometers nor more than 1500 nm, and the bases of which contact the bases of substantially all adjacent protuberances,
   (2) replicating said first microstructured layer by embossing, casting, or vacuum metallizing onto the surface of a second layer, said second layer being a metal, to provide said metal with a microstructured surface of randomly positioned discrete protuberances, and
   (3) removing said second layer from said first microstructured layer to provide said metal with a substantially radiation absorbing surface of randomly positioned discrete protuberances, and
   (b) orienting said radiation absorbing surface such that said microstructured surface is contacted with radiant energy so as to absorb radiant energy.

2. The method according to claim 1 wherein said metallized second layer is selected from chromium, aluminum, copper, gold, nickel, and metal alloys.

3. The method according to claim 1 wherein the tips of said protuberances are spaced apart a distance in the range of 3 to 500 nm.

4. The method according to claim 1 wherein the average spacing between the tips of said protuberances is in the range of 1/10 and ¼ the average height of the protuberances.

5. The method according to claim 1 wherein the radiant energy absorbance by said metal over the total solar range of said article is within the range of 70 percent to 98 percent.

6. The method according to claim 1 wherein said metal is a selective solar absorber.

7. The method according to claim 1 wherein said metal is a flat plate solar collector.

* * * * *